Sept. 5, 1944.　　　　P. C. READ　　　　2,357,358
UNLOADING MECHANISM FOR BOTTLE WASHING MACHINES
Filed Oct. 15, 1941　　　2 Sheets-Sheet 1

Inventor
Philip C. Read
By Ira Milton Jones
Attorney

Sept. 5, 1944. P. C. READ 2,357,358
UNLOADING MECHANISM FOR BOTTLE WASHING MACHINES
Filed Oct. 15, 1941 2 Sheets-Sheet 2

Inventor
Philip C. Read
By Ira Mutton Jones
Attorney

Patented Sept. 5, 1944

2,357,358

UNITED STATES PATENT OFFICE 2,357,358

UNLOADING MECHANISM FOR BOTTLE-WASHING MACHINES

Philip C. Read, Shorewood, Wis., assignor to Dostal & Lowey Co., Inc., Menomonee Falls, Wis., a corporation of Wisconsin Application October 15, 1941, Serial No. 415,010

5 Claims. (Cl. 198—27)

This invention relates to bottle washing machines and refers particularly to the unloading mechanism thereof by which the washed bottles are automatically transferred from the machine to an unloading conveyor.

In bottle washing machines of the type to which this invention pertains, the bottles are carried through the machine by a conveyor composed of connected transverse flights each equipped to carry a plurality of bottles in a row. The bottles are loaded on this conveyor in inverted position and likewise are inverted when they arrive at the unloading station. The transfer mechanism thus has the dual function of setting the bottles right-side-up and depositing them on the unloading conveyor which extends transversely across the machine.

In the unloading mechanisms heretofore employed in machines of this type, the tray on which the bottles are deposited preparatory to being set right-side-up on the unloading conveyor was pivotally mounted on its carrier structure in such a manner that the tray swung out toward the unloading conveyor to push the bottles onto the conveyor. In all instances, though, the construction was such that the tray pushed only against the lower portion of the bottles so that at times the bottles would be tipped.

It is, therefore, an object of this invention to improve the construction of the transfer mechanism to the extent that the pressure applied to the bottles is distributed over substantially the entire height of the bottles to thus preclude the objectionable possibility of the tray tipping the bottles as it pushes them onto the unloading conveyor.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Figure 1:
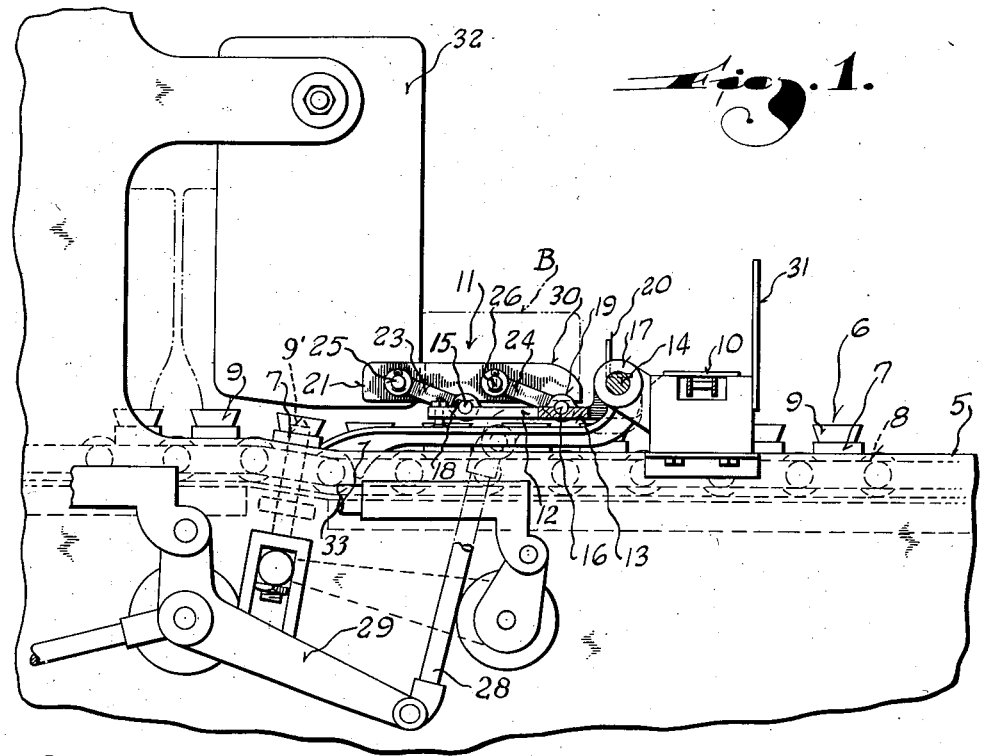
Figure 1 is a side view showing a portion of a bottle washing machine embodying this invention, parts thereof being broken away and in section, the pivoted transfer unit being in its lowered bottle receiving position.

Referring now particularly to the accompanying drawings, in which like numerals indicate like parts, the numeral 5 designates the casing of a bottle washing machine, which, as is customary, forms a tank to hold the cleaning fluid through which the bottles B are carried by a conveyor 6. The conveyor 6 is composed of a series of transverse bottle carrying flights 7 connected at their ends to conveyor chains 8 which run on suitable tracks fixed to the side walls of the casing.

The transverse flights are equipped with bottle receiving sockets 9 in which the bottles are deposited up-side-down to be locked in place by locking bars (not shown) carried by the flights.

Drive mechanism also not shown, intermittently advances the conveyor to successively present the rows of bottles carried on the flights to the various cleaning sprays and to likewise successively present the washed bottles to an unloading station at which the bottles arrive in inverted position.

The unloading station may be generally defined as the space adjacent to or in front of an unloading conveyor 10 which extends transversely across the machine and which consists of a continuously travelling endless conveyor supported on suitable tracks or merely a track along which the bottles may be slid.

The bottles are deposited right-side-up on the unloading conveyor by a transfer mechanism indicated generally by the numeral 11. As noted hereinbefore, this mechanism is designed so as to deposit the bottles right-side-up on the unloading conveyor without danger of tipping them during their deposition on the unloading conveyor. To this end, the transfer mechanism consists of a pivoted frame 12 formed by two arms 13 secured to opposite ends of a cross shaft 14 and connected by tie rods 15 and 16.

The shaft 14 is journalled in bearings 17 which may be extended from the supporting structure of the unloading conveyor so that the shaft 14 which defines the pivot axis of the pivoted frame 12 extends along the front edge of the unloading conveyor. The tie rods 15 and 16 have their ends anchored in bosses 18 and 19, respectively, formed as integral parts of the arms 13.

Figure 2:
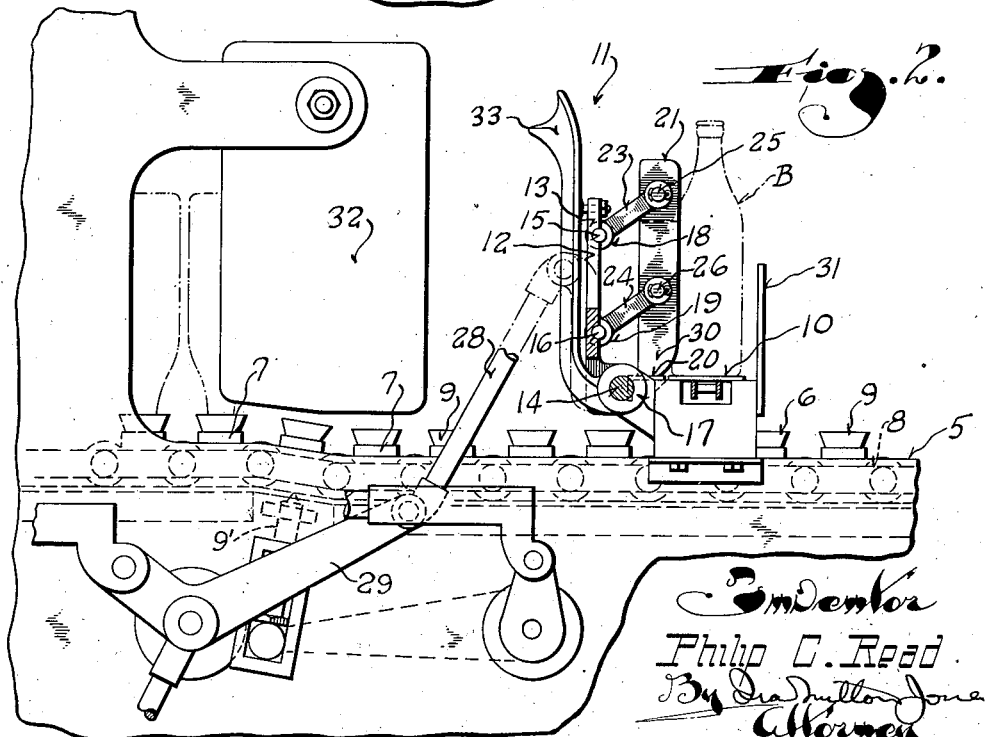
Figure 2 is a view similar to Figure 1 but showing the transfer unit in its raised position depositing bottles on the unloading conveyor.
Figure 3:
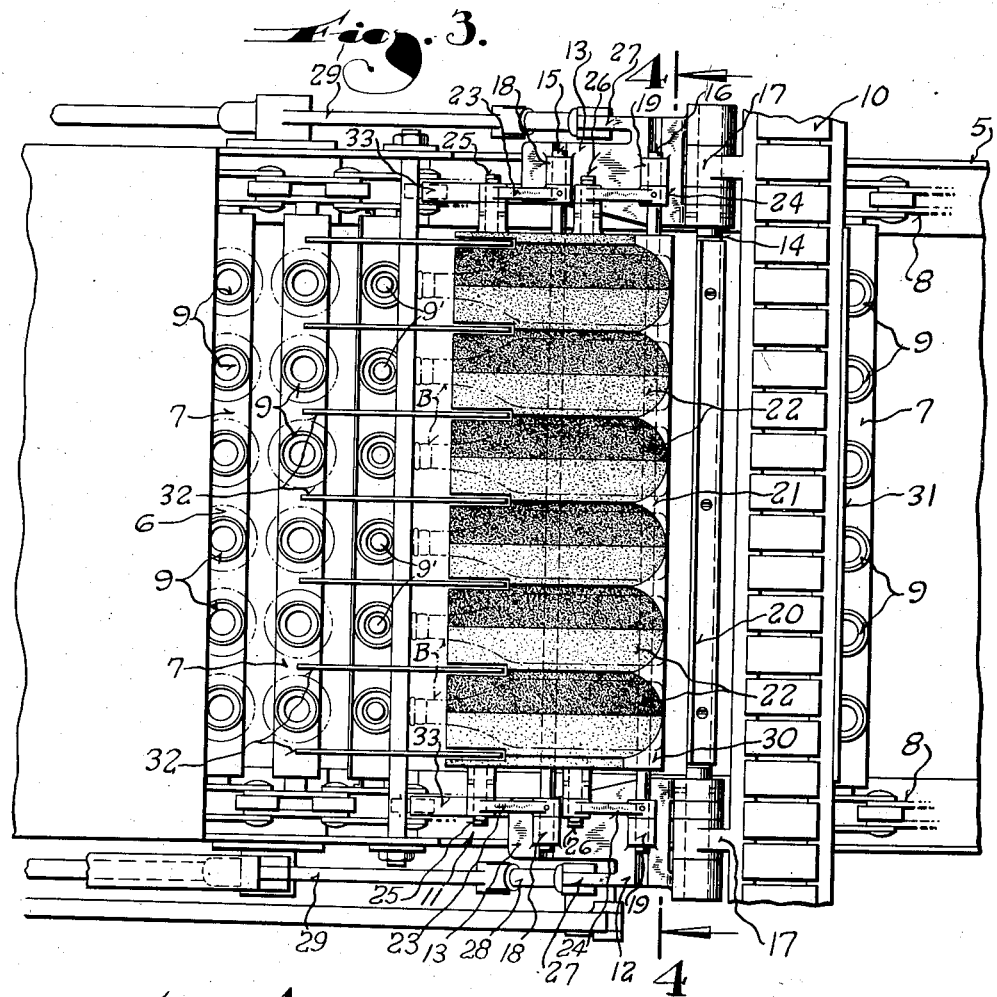
Figure 3 is a top plan view of that portion of the bottle washing machine shown in Figures 1 and 2.
Figure 4:
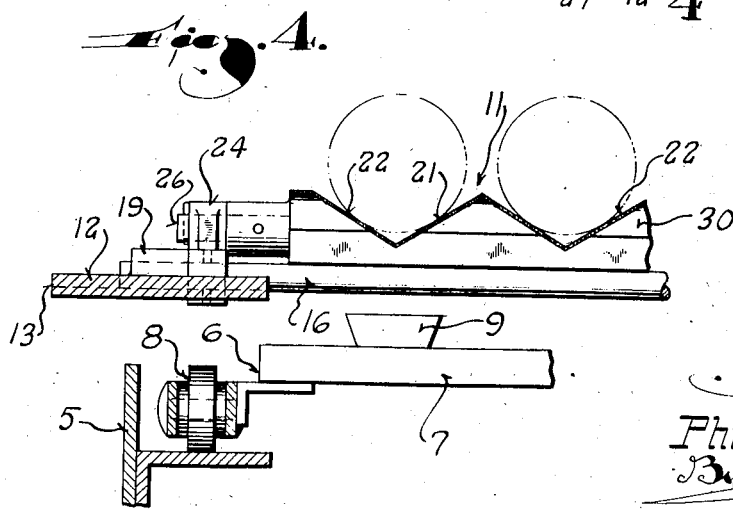
Figure 4 is a detail sectional view taken on the plane of the line 4—4 in Figure 3.

Fixed to the shaft 14 is an angle iron member which provides a ledge 20 disposed at right angles to the plane of the pivoted frame and so positioned that when the frame is elevated to its raised substantially vertical position shown in Figure 2, the ledge is flush with and directly adjacent to the front edge of the unloading conveyor 10. Hence, bottles resting on the ledge 20 may be readily pushed off the ledge and onto the conveyor 10.

Superimposed on the pivoted frame is a bottle carrying tray 21. This tray is formed with a plurality of side-by-side, substantially V-shaped troughs 22 equivalent in number to the number of bottle carrying sockets 9 on each conveyor flight 7.

A parallelogram linkage connects the bottle carrying tray with the pivoted frame. This parallelogram linkage comprises parallelogram links 23 and 24, each respectively pivoted to the ends of the tie rods 15 and 16 and to studs 25 and 26, respectively, extended from the sides of the tray. Hence, when the pivoted frame is in its lowered position shown in Figure 1, the tray rests flatwise thereon and is in position to have bottles deposited on the top of the tray.

As shown and described in the copending application of Philip C. Read, Serial No. 373,062, the deposition of bottles onto the tray is effected by plungers 9' which rise up through the sockets of the flight in position in front of the tray and tip the bottles thereon onto the tray.

The drive mechanism of the machine then elevates the pivoted frame to its position shown in Figure 2. The connection between the frame and the drive mechanism is supplied by lever arms 27 formed as part of the arms 13 and to which links 28 driven from an oscillating bell crank 29 are connected. The bell crank 29 is in turn oscillated by the drive mechanism of the machine, not shown.

As the pivoted frame is swung to its vertical position, the bottle tray, by virtue of the parallelogram linkage which connects it with the pivoted frame, swings outwardly toward the unloading conveyor until the lower end 30 of the tray rests on the ledge 20. It is to be observed that the tray is at all times parallel to the pivoted frame and that in its position farthest from the frame, in which position it is supported by the ledge 20, it is parallel with a back stop 31 extending along the unloading conveyor. Consequently, the lateral shove given the bottles by the tray is applied over substantially the entire height of the bottles rather than at a localized point near the bottom. The tendency, incident to previous constructions, for the bottle to tip, is thus entirely overcome.

As described in the aforesaid copending application, Serial No. 373,062, the upper end of the tray is slotted to accommodate partition walls 32 which guide the bottles onto the tray as they are lifted out of the sockets by the rising plungers, and as also described in said copending application, the pivoted frame preferably carries latch arms 33 which drop down onto the conveyor chains 8 to hold the conveyor against shifting during the transfer of the bottles from the conveyor to the tray.

From the foregoing description, taken in connection with the accompanying drawings, it will be readily apparent to those skilled in the art that this invention provides an exceedingly simple but effective manner of overcoming the tendency inherent in past bottle transfer mechanisms to tip the bottles as they are deposited in the unloading conveyor.

What I claim as my invention is:

1. In a bottle washing machine having a carrier by which bottles are carried through the machine and presented in inverted positions to an unloading point for transfer to a bottle receiving support adjacent to the unloading point: mechanism for transferring bottles from the carrier to said support and depositing them right-side-up on the support including, a structure pivoted to swing about a substantially horizontal axis extending transversely across the carrier, from a lowered, substantially horizontal position to a raised, substantially vertical position, a bottle receiving tray, and parallelogram linkage connecting the bottle receiving tray with said pivoted structure so that the bottle receiving tray swings away from the pivoted structure as said structure is raised to push bottles carried by the tray onto the support with a pressure distributed over a substantial portion of the bottle height.

2. In a bottle washing machine having a conveyor for carrying bottles through the machine and having a bottle receiving support extending transversely across one run of said conveyor for receiving washed bottles, said conveyor presenting the washed bottles to the support in inverted position: means for transferring bottles from the conveyor to said support and depositing the same right-side-up thereon including a structure pivoted to swing on an axis extending along an edge of the support and transversely across the conveyor; means for swinging said pivoted structure from a lowered bottle receiving position to a raised bottle discharging position; a bottle receiving tray overlying said pivoted structure; and parallelogram levers connecting the tray with the pivoted structure so that the tray swings bodily out from said pivoted structure as it is raised to a bottle discharging position to thereby push bottles carried by the tray onto the support.

3. A bottle handling mechanism comprising: a frame structure pivoted to swing about a horizontal axis between substantially horizontal and vertical positions; a tray shaped to hold a plurality of bottles in side-by-side relation; a parallelogram linkage connecting the tray with said pivoted frame structure so that the tray is movable in an arc toward and from the pivoted frame structure with the tray remaining substantially parallel to said pivoted frame structure; and means for limiting movement of the tray away from the pivoted frame structure a distance less than the possible maximum so that when the pivoted frame structure swings from its lowered position to its raised position the tray moves by gravity away from the pivoted frame structure to push bottles received thereon in a direction away from the pivoted frame structure.

4. In a bottle washing machine of the type wherein bottles are carried through the machine by a conveyor which presents the washed bottles to an unloading station in inverted position for transfer to a transversely extending unloading conveyor: means for transferring washed bottles from the machine conveyor to said unloading conveyor including a structure pivoted to swing about a horizontal axis extending transversely across the machine and adjacent to said unloading conveyor; a bottle supporting ledge on said pivoted structure adjacent to its pivot adapted to align with the unloading conveyor in the raised position of the pivoted structure; a bottle receiving tray superimposed on said pivoted structure; and links pivotally connecting said tray with the pivoted structure so as to form therewith a parallelogram whereby the tray swings in an arc from a position flat against the pivoted supporting structure to a position spaced therefrom during swinging of the pivoted structure to a raised position to push bottles carried by the tray and resting on the ledge off the ledge and onto the unloading conveyor.

5. In a bottle washing machine of the type wherein bottles are carried through the machine by a conveyor which presents the washed bottles to an unloading station in inverted position for transfer to a transversely extending unloading conveyor: means for transferring washed bottles from the machine conveyor to said unloading conveyor including a structure pivoted to swing about a horizontal axis extending transversely across the machine and adjacent to said unloading conveyor; a bottle supporting ledge on said pivoted structure adjacent to its pivot adapted to align with the unloading conveyor in the raised position of the pivoted structure; a bottle receiving tray superimposed on said pivoted structure; and links pivotally connecting said tray with the pivoted structure so as to form therewith a parallelogram whereby the tray swings in an arc from a position flat against the pivoted supporting structure to a position spaced therefrom during swinging of the pivoted structure to a raised position to push bottles carried by the tray and resting on the ledge off the ledge and onto the unloading conveyor, said outward swinging movement of the tray being limited by the engagement of the tray with the ledge.

PHILIP C. READ.